Jan. 31, 1961   W. R. NASON   2,969,917
SPACE HEATING CONTROL SYSTEM AFFECTED BY EXTERNAL TEMPERATURES
Filed June 24, 1957
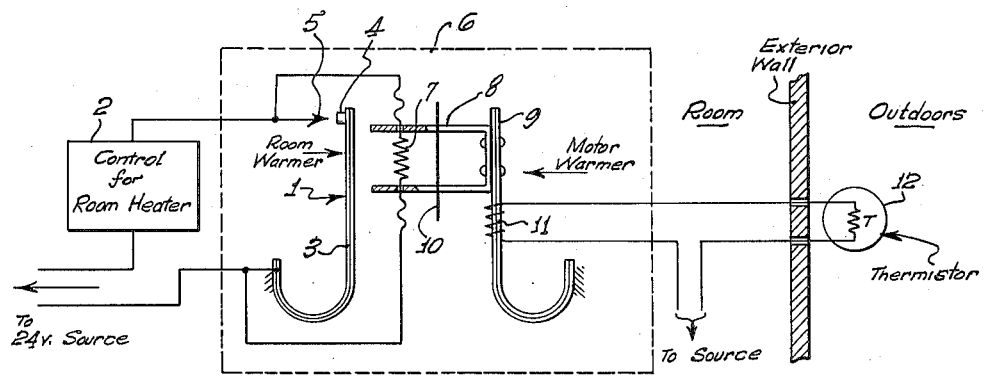
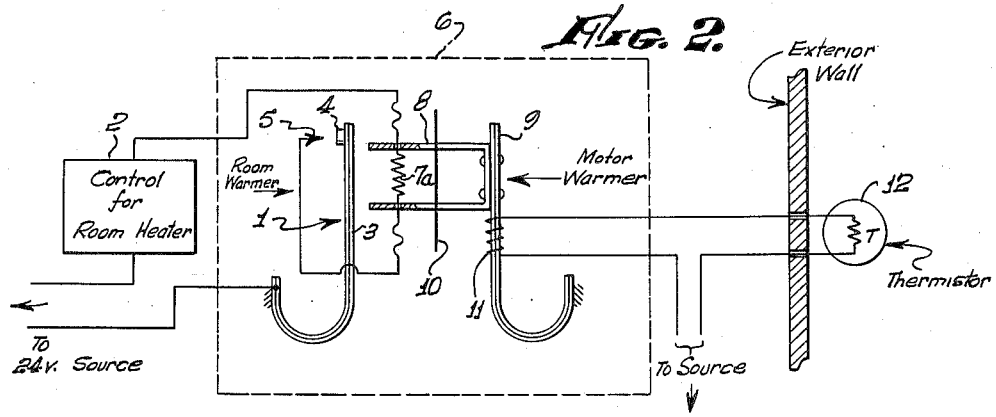
WILLIS R. NASON,
INVENTOR.
BY
ATTORNEYS.

United States Patent Office 2,969,917
Patented Jan. 31, 1961

2,969,917

SPACE HEATING CONTROL SYSTEM AFFECTED BY EXTERNAL TEMPERATURES

Willis R. Nason, Seattle, Wash., assignor to General Controls Co., Glendale, Calif., a corporation of California Filed June 24, 1957, Ser. No. 667,461

3 Claims. (Cl. 236—91)

This invention relates to space heating systems, and particularly to thermostat controls for such systems, used for heating rooms, auditoriums, theatres, or the like.

It is common to control the source of heat in response to the closing of a thermotsat switch subjected to the temperature of the space that is being heated.

It has been found desirable to modify the operation of the thermostat switch as by aid of a heat anticipator. The heaters employed by such heat anticipators are often so arranged as to be energized only while the space demands additional heat. For example, a heater may be provided in the thermostat casing which causes the thermostat switch to open earlier than otherwise, thus "anticipating" the temperature ultimately attained in the room or space. Upon continued energization of the heater, a "droop" or "offset" is noted, due to accumulated heating within the thermostat case, causing the thermostat switch to open earlier than it should. This "droop" should be somehow compensated for.

Another factor that affects this "droop" or "offset" is the differential between external and internal temperatures. When the outside temperature is quite low, the thermostat should remain closed for a longer time than when the external temperature is relatively high.

It is one of the objects of this invention to compensate for the droop by adjusting the position of the thermostat heating means with relation to the thermostat. For example, if the thermostat switch is to open earlier, the heating means is moved closer; if later, then the heating means is moved farther from the thermostat.

It is another object of this invention to provide automatic adjustment of the position of the heating means in response to a definite function or condition, such as external temperature.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a wiring diagram of a system incorporating the invention; and

Fig. 2 is a view similar to Fig. 1 of a modified form of the invention.

The system includes a thermostat structure 1 for causing energization of a control 2 for a room heater. This thermostat structure 1 may be of the type in which a bimetal member 3 is provided, carrying a movable contact member 4, which member 4 is adapted to engage another contact member 5.

When the space in which the thermostat 1 is located demands more heat, the bimetal member 3 flexes toward the left, causing engagement of contact members 4 and 5 and thereby energizing the control 2 for the room heater. The source may be a standard twenty-four volt type.

An enclosure or casing 6 is provided for the thermostat 1.

In order to modify the operation of the thermostat device 1, a supplemental heating means 7 is provided. This supplemental heating means may take the form of an electric heater joined across the terminal of the thermostat contact members 4 and 5. Accordingly, when the contact members 4 and 5 are in engagement, the electric heater 7 is accordingly active only while the thermostat 1 is in inactive position; however, the resistance of the heater is such that the current flowing through it and the control 2 is insufficient to initiate the operation of the heater.

The heater 7 is so arranged that its position with respect to the bimetal 3 may be adjusted so as to alter or adjust the amount of heat transferred as by radiation to the bimetal 3. For this purpose, the heater 7 is mounted on a bracket 8. This bracket in turn is carried by a movable support, such as a bimetal member 9 also located in housing 6. A shield and reflector 10 may be interposed between the bimetal 9 and the electric heater 7. In this way, the heating effect of the electric heater 7 is confined substantially entirely to the heating of the juxtaposed bimetal member 3.

The bimetal member 9 is caused to flex toward the left when its temperature increases, thereby causing the electric heater to be more closely positioned to the bimetal member 3.

The bimetal member 9 is adapted to be heated by a heating coil 11 in heat transfer relation to this member. Coil 11 forms a second electric heater. It is energized in accordance with changes in temperature in a space remote from the space being controlled. For example, the current through the heater 11 may be determined by a thermistor device 12 located outside of the space, said thermistor device having a resistance that increases as the temperature decreases. Therefore, if the thermistor 12 is subjected to a decreasing temperature, the current through the heater 11 is also reduced and the bimetal 9 moves the electric heater 7 farther away from the bimetal 3. Accordingly, it will take a shorter time for the thermostat device 1 to close the circuit for the control for the room heater.

On the other hand, if the outside temperature should rise, an increased heating current is effective for the heater 11 and the bimetal support 9 moves the electric heater 7 closer to the bimetal 3, thereby delaying the engagement of the contact members 4 and 5.

When it is very cold outside, the resistance of the thermistor 12 increases (as the temperature decreases) causing less current to flow through the resistance 11 on bimetal 9. This causes heater 7 to be pushed further away from the main controlling bimetal 1. Thus, when it is cold outside, the main controlling bimetal 1 will close at higher than normal room temperature; and when same closes, since heater 7 is in parallel with the bimetal circuit, and contacts 4 and 5 make, the heat from element 7 decreases, thus causing more than normal cycle length of "heat on time" applied to the room before the circuit "breaks" due to bimetal 1 responding to the increase in room temperature.

Conversely, when it is warmer outside, more current flows through heater 11; consequently, more heat is given off, causing bimetal 9 to bend, moving heater 7 towards main bimetal 3. Further, the main bimetal 3 does not close contact until the room temperature is lower than normal; and because of the close proximity of heater 7 to the main bimetal 3, shorter cycles of heating will occur at these more mild temperature conditions. This is because, as soon as the main bimetal 1 "breaks" contact between contacts 4 and 5, heater 7 increases its heat output, causing bimetal 3 to move to the cooler position before contacts 4 and 5 again make contact.

The thermistor circuit including the elements 11 and 12 may be connected to an appropriate source of electrical energy.

The form shown in Fig. 2 has the same elements as before. However, the electric heater 7a is arranged in series rather than in parallel with the contact members 4 and 5. Accordingly, the heater 7a is active only when the contact members 4 and 5 are in engagement. This corresponds to a position in which more heat is demanded by the space. Accordingly, the heater 7a is active only while this condition exists.

The inventor claims:

1. In a space heating control system including a first bimetal member exposed to the temperature of the space, and a circuit controller having a pair of contact members adapted to perform a controlling function upon a heating apparatus, by making and breaking said contact members, said circuit controller being operated by said first bimetal member: a first electrical heater for radiating heat to said first bimetal member; means whereby said circuit controller energizes said first heater only while said circuit controller is in one of its two alternative controlling positions; a second bimetal member mechanically moving said first heater so as to adjust the distance between the first bimetal member and said first heater as said second bimetal member flexes in accordance with its temperature; a second electric heater for imparting heat to the second bimetal member; and a heating circuit for said electric heater, including a resistor in series with said second electric heater, said heating circuit being continuously energized; said resistor having an effective value dependent upon its temperature and being located outdoors so as to be subjected to the outdoor temperature.

2. The combination as set forth in claim 1, in which the circuit controller serves to energize the first electric heater when no heat is demanded by the first bimetal member, and the second bimetal member moves the said first electric heater away from the first bimetal member upon a reduction in outdoor temperature.

3. The combination as set forth in claim 1, in which the circuit controller serves to energize the first electric heater when heat is demanded by the first bimetal member, and the second bimetal member moves the said first electric heater away from the first bimetal member upon a reduction in outdoor temperature.

References Cited in the file of this patent

UNITED STATES PATENTS

| 1,798,923 | Baker | Mar. 31, 1931 |
| 1,997,559 | Hajek | Apr. 9, 1935 |
| 2,009,601 | Anderson | July 30, 1935 |
| 2,092,869 | Baum | Sept. 14, 1937 |
| 2,732,132 | Hulett | Jan. 24, 1956 |